United States Patent
Hsieh et al.

(10) Patent No.: US 8,842,905 B2
(45) Date of Patent: Sep. 23, 2014

(54) 2D TO 3D IMAGE CONVERSION APPARATUS AND METHOD THEREOF

(75) Inventors: Chun-Hsing Hsieh, Hsinchu (TW); Hao-Ying Cheng, Hsinchu (TW); Chia-Wei Yu, Taipei (TW); Cheng-Hsin Chang, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 170 days.

(21) Appl. No.: 13/517,750

(22) Filed: Jun. 14, 2012

(65) Prior Publication Data

US 2013/0028507 A1  Jan. 31, 2013

(30) Foreign Application Priority Data

Jul. 25, 2011 (TW) .............................. 100126234 A

(51) Int. Cl.
 *G06K 9/00* (2006.01)
 *H04N 13/02* (2006.01)
(52) U.S. Cl.
 CPC .................................. *H04N 13/026* (2013.01)
 USPC ....................................................... 382/154

(58) Field of Classification Search
 None
 See application file for complete search history.

(56) References Cited

U.S. PATENT DOCUMENTS

| | | | |
|---|---|---|---|
| 7,573,475 B2 * | 8/2009 | Sullivan et al. | 345/427 |
| 2007/0279412 A1 | 12/2007 | Davidson et al. | |
| 2011/0158504 A1 * | 6/2011 | Turner et al. | 382/154 |

* cited by examiner

*Primary Examiner* — Daniel Mariam
(74) *Attorney, Agent, or Firm* — McClure, Qualey & Rodack, LLP

(57) ABSTRACT

A 2D to 3D image conversion apparatus includes a data queue, a conversion unit and an offset calculation unit. The data queue receives and temporarily stores an input data value corresponding to a current pixel. The conversion unit outputs a current offset table corresponding to a current depth parameter of the current pixel. The current offset table includes (m+1) reference offsets corresponding to the current pixel and neighboring m pixels. The offset calculation unit selects one of the reference offsets corresponding to the current pixel in the current offset table and multiple previous offset tables as a data offset corresponding to the current pixel. The data queue selects and outputs an output data value corresponding to the current pixel according to an integer part of the data offset and the input data value.

20 Claims, 9 Drawing Sheets

2D TO 3D IMAGE CONVERSION APPARATUS AND METHOD THEREOF

This application claims the benefit of Taiwan application Serial No. 100126234, filed Jul. 25, 2011, the subject matter of which is incorporated herein by reference.

BACKGROUND

1. Technical Field

The invention relates in general to a 2D to 3D image conversion apparatus and a method thereof.

2. Background

With vigorous development of modern technology, people start to seek more real visual enjoyment than a 2D image device provided. Thus recently related 3D image technology has been matured day by day. To form 3D images, currently general 2D image apparatus have to cooperate 2D images with corresponding depth tables to rendering dual images corresponding to 3D glasses to achieve 3D effects by viewing with said 3D glasses. However, data loss problems often occur in the image warping procedure of the 2D images cooperated with the corresponding depth tables.

Referring to FIG. 1, a schematic illustration of a conventional 2D to 3D image procedure is shown. In FIG. 1, pixels perform image warping according to offsets related to depths. For example, an offset corresponding to a pixel P4 is 3, and an input data value d4 is shifted as an output data value of a pixel P7. More, an offset corresponding to a pixel P5 is 1, and an input data value d5 is shifted as an output data value of a pixel P6. However, as shown in FIG. 1, output data values of the pixels P1, P5, P8, P9 and P10 are lost. In addition, the input data values of the pixels P4 and P6 are both shifted as an output data value of the pixel P7, and the output data values of the pixels P6 and P7 suffers data crossing problems. Hence, not only additional hole filling but also other image processing have to be performed on the output data values to obtain desired disparity dual images. Consequently, not only additional resources have to be exhausted to perform hole filling, but also the whole efficiency of the image processing system is decreased.

SUMMARY

The disclosure is directed to a 2D to 3D image conversion apparatus and a method thereof, utilizing simple depth image based rendering and capable of converting a 2D image into a 3D image without additional hole filling.

According to a first aspect of the present disclosure, a 2D to 3D image conversion apparatus is provided. The 2D to 3D image conversion apparatus includes a data queue, a conversion unit and an offset calculation unit. The data queue is for receiving and temporarily storing an input data value corresponding to a current pixel. The conversion unit is for outputting a current offset table corresponding to a current depth parameter of the current pixel. The current offset table includes (m+1) reference offsets corresponding to the current pixel and neighboring m pixels, and m is a positive integer. The offset calculation unit is for selecting one of the reference offsets corresponding to the current pixel in the current offset table and multiple previous offset tables as a data offset corresponding to the current pixel. The data queue selects and outputs an output data value corresponding to the current pixel according to an integer part of the data offset and the input data value.

According to a second aspect of the present disclosure, a 2D to 3D image conversion method, including the following steps, is provided. An input data value corresponding to a current pixel is received and temporarily stored. A current offset table corresponding to a current depth parameter of the current pixel is outputted. The current offset table includes (m+1) reference offsets corresponding to the current pixel and neighboring m pixels, and m is a positive integer. One of the reference offsets corresponding to the current pixel in the current offset table and multiple previous offset tables is selected as a data offset corresponding to the current pixel. An output data value corresponding to the current pixel is selected and outputted according to an integer part of the data offset and the input data value.

The invention will become apparent from the following detailed description of the preferred but non-limiting embodiments. The following description is made with reference to the accompanying drawings.

DETAILED DESCRIPTION OF THE INVENTION

The disclosure proposes a 2D to 3D image conversion apparatus and a method thereof with simple depth image based rendering, capable of converting a 2D image into a 3D image without additionally hole filling.

Figure 1:
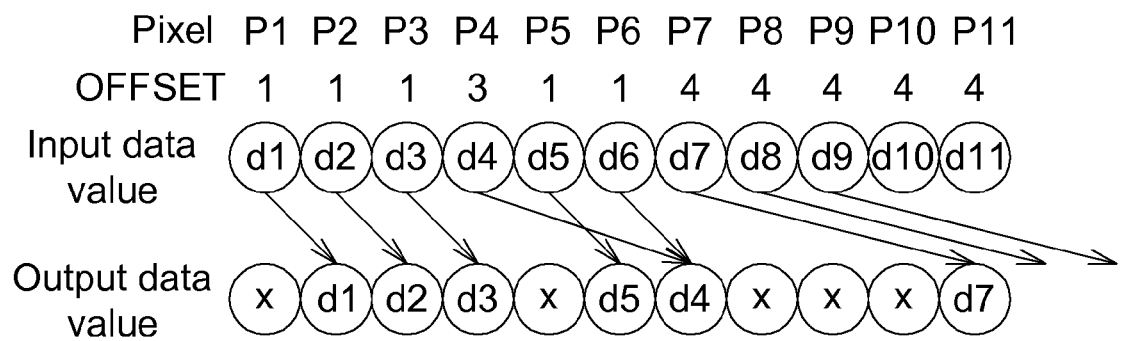
FIG. 1 shows a schematic illustration of a conventional 2D to 3D image procedure.
Figure 2:
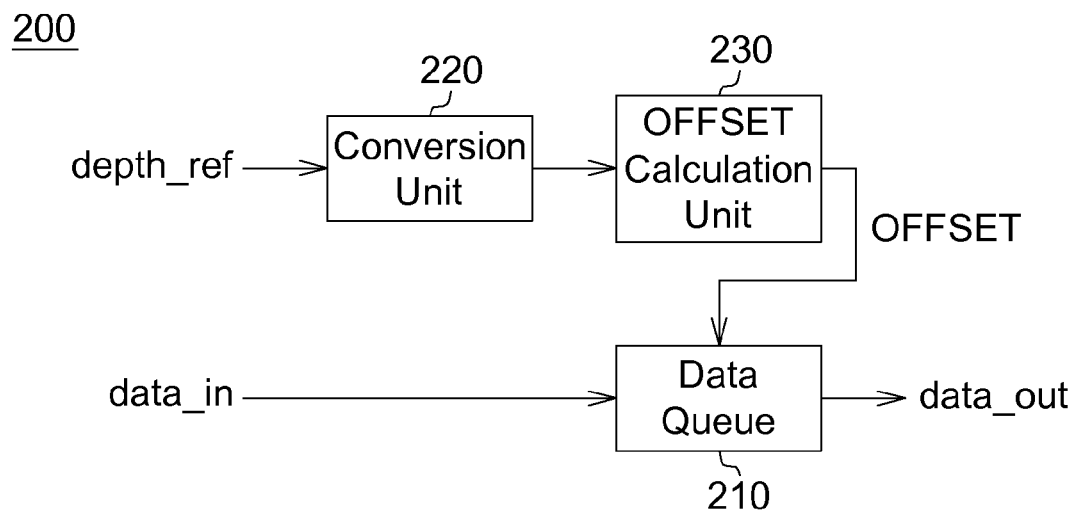
FIG. 2, a block diagram illustrating a 2D to 3D image conversion apparatus according to an embodiment is shown.
Figure 3:
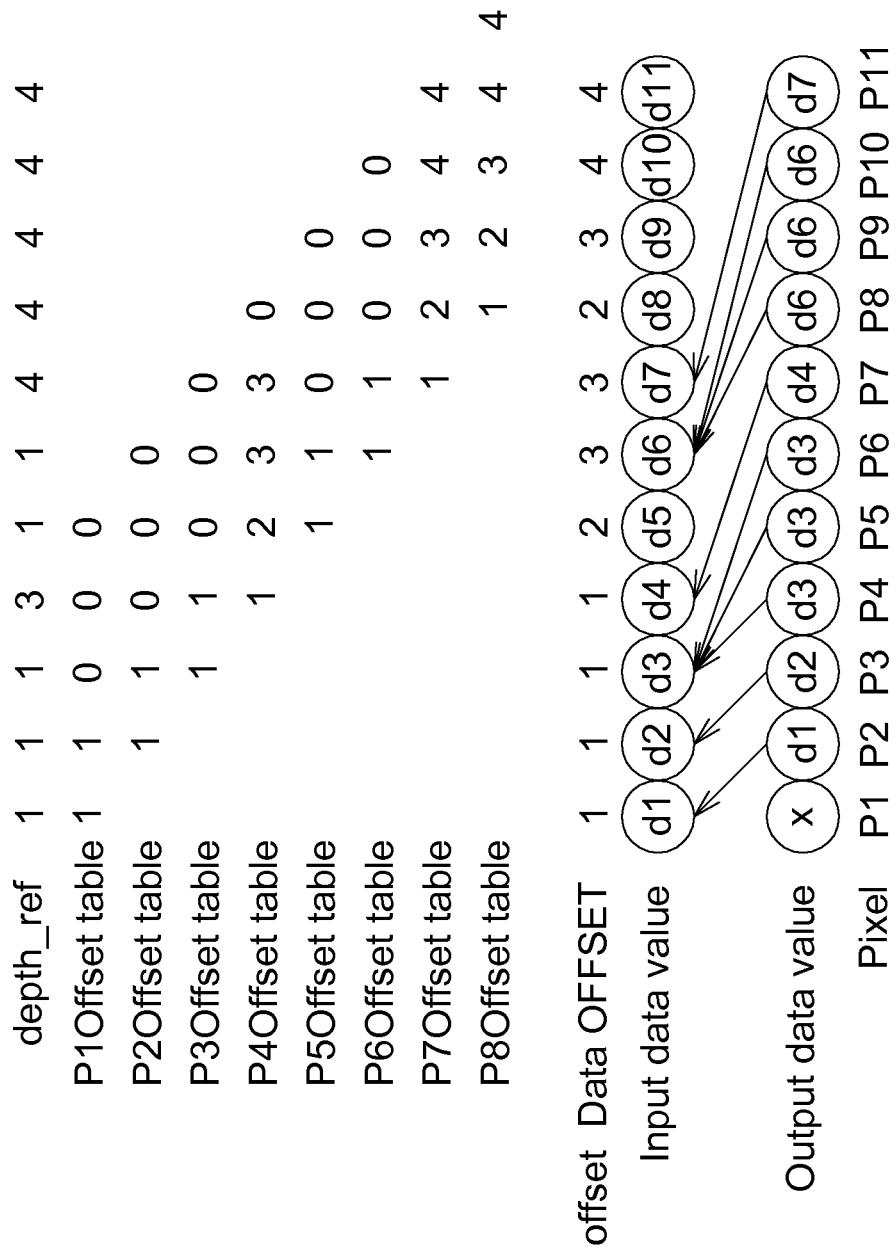
FIG. 3 shows a simple schematic illustration of a 2D to 3D image conversion procedure according to an embodiment.

Referring to FIG. 2, a block diagram illustrating a 2D to 3D image conversion apparatus according to an embodiment is shown. The 2D to 3D image conversion apparatus 200 includes a data queue 210, a conversion unit 220 and an offset calculation unit 230. The data queue 210 receives and temporarily stores an input data value data_in corresponding to a current pixel.

The conversion unit 220 outputs a current offset table corresponding to a current depth parameter depth_ref of the current pixel. In implementation, the conversion unit 220 can be designed to obtain the current offset table from an Offset LUT according to the current depth parameter depth_ref, or to obtain the current offset table by inserting the current depth parameter depth_ref into a formula, but it is not limited thereto and decided according to the design requirements.

The current offset table includes (m+1) reference offsets corresponding to the current pixel and neighboring m pixels, and m is a positive integer and the maximum possible offset. For example, the current offset table includes 5 reference offsets if the maximum possible offset is 4. In addition, the neighboring m pixels may be subsequent to the current pixel, or antecedent to the current pixel, and is not limited thereto. The offset calculation unit 230 selects one of the reference offsets corresponding to the current pixel in the current offset table and multiple previous offset tables as a data offset OFFSET corresponding to the current pixel. The data offset OFFSET may be a maximum value or a minimum value of the reference offsets. Then take the data offset OFFSET be the maximum value as being exemplified, and it is substantially not limited thereto and can be changed according to the requirements. The data queue 210 selects and outputs an output data value data_out corresponding to the current pixel according to an integer part of the data offset OFFSET and the input data value data_in.

Referring concurrently now to FIG. 3 and FIGS. 4A to 4K, FIG. 3 shows a simple schematic illustration of a 2D to 3D image conversion procedure according to an embodiment, and FIGS. 4A to 4K show detailed schematic illustrations of a 2D to 3D image conversion procedure according to an embodiment. Assume that the data queue 210 sequentially receives input data values data_in, d1, d2, . . . , d8, d9, d10, d11, . . . of pixels P1, P2, . . . , P8, P9, P10, P11, . . . and etc., and the conversion unit 220 also sequentially receives corresponding depth parameters depth_ref, 1, 1, . . . , 4, 4, 4, 4, . . . and etc. The depth parameters depth_ref can be estimated and generated by a depth sensor, a video signal itself, or a 2D to 3D rendering engine, and it is not limited thereto.

Figure 4A:
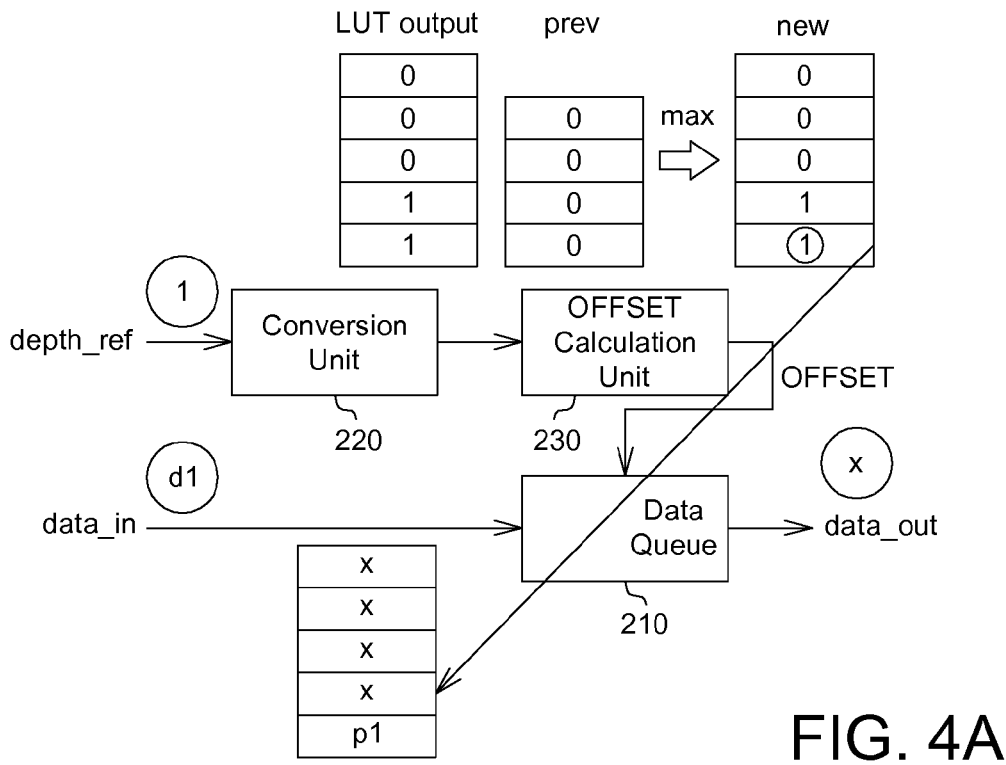
FIGS. 4A to 4K show detailed schematic illustrations of a 2D to 3D image conversion procedure according to an embodiment.

In addition, the depth parameter depth_ref can be a depth, or other parameters obtained by image algorithms, such as a shift offset. The depth is exemplified as an example herein, but it is not limited. Besides, corresponding to the current depth parameter y, it is assumed that a formula of the conversion unit 220 for outputting the current offset table corresponding to the current depth parameter is 1, 2, 3, . . . , (y−1), y, y, 0, 0, . . . , etc. In FIG. 4A, the data queue 210 receives and temporarily stores an input data value data_in (d1) corresponding to a current pixel (P1). The conversion unit 220 outputs a current offset table LUT output (1, 1, 0, 0, 0) corresponding to a current depth parameter (1) according to the current depth parameter depth_ref (1) of the current pixel (P1). In the example, the current offset table LUT output includes (4+1) reference offsets as the maximum possible depth parameter is set to be 4.

The offset calculation unit 230 correspondingly compares the current offset table LUT output with a previous offset table prev (0, 0, 0, 0) for maximization to obtain a new offset table new (1, 1, 0, 0, 0), which includes the reference offset (1) corresponding to the current pixel P1 and 4 reference offsets (1, 0, 0, 0) of the subsequent 4 pixels. The reference offset 1 corresponding to the current pixel P1 is outputted as the data offset OFFSET (1), and the 4 reference offsets (1, 0, 0, 0) is regarded as a previous offset table of the next pixel P2. The data queue 210 selects the first data from right to left based on the input data value data_in (d1) according to an integer part of the data offset OFFSET (1) to output an output data value data_out corresponding to the current pixel P1. Due to the current pixel P1 is the first pixel and there exists no data at its left side, the output data value data_out corresponding to the current pixel P1 is (x). In other embodiments, the 4 reference offsets may be 4 neighboring pixels antecedent to the current pixel P1, or 2 pixels antecedent to the current pixel P1 and 2 pixels subsequent to the current pixel P1.

Figure 4B:
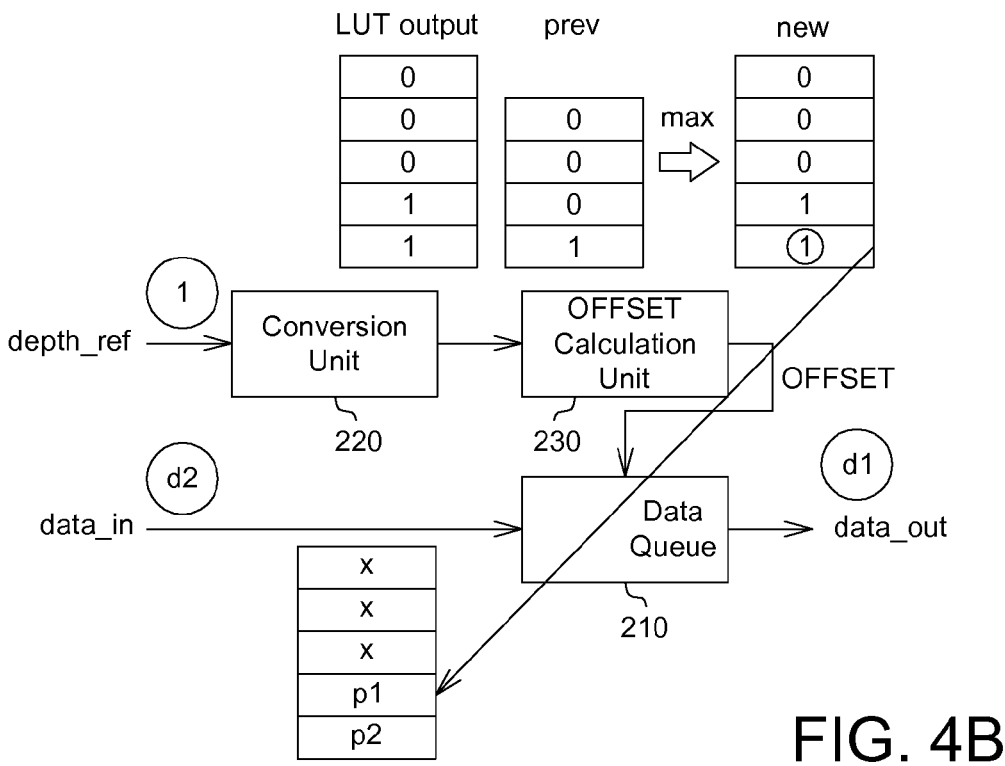

In FIG. 4B, the data queue 210 receives and temporarily stores an input data value data_in (d2) corresponding to a current pixel (P2). The conversion unit 220 outputs a current offset table LUT output (1, 1, 0, 0, 0) corresponding to a current depth parameter (1) according to the current depth parameter depth_ref (1) of the current pixel (P2). The offset calculation unit 230 correspondingly compares the current offset table LUT output with the previous offset table prev (1, 0, 0, 0) for maximization to obtain a new offset table new (1, 1, 0, 0, 0). The reference offset 1 corresponding to the current pixel P2 is outputted as the data offset OFFSET (1), and the 4 reference offsets (1, 0, 0, 0) is regarded as a previous offset table of the next pixel P3. The data queue 210 selects the first data from right to left based on the input data value data_in (d2) according to an integer part of the data offset OFFSET (1) to output an output data value data_out (d1) corresponding to the current pixel P2.

Figure 4C:
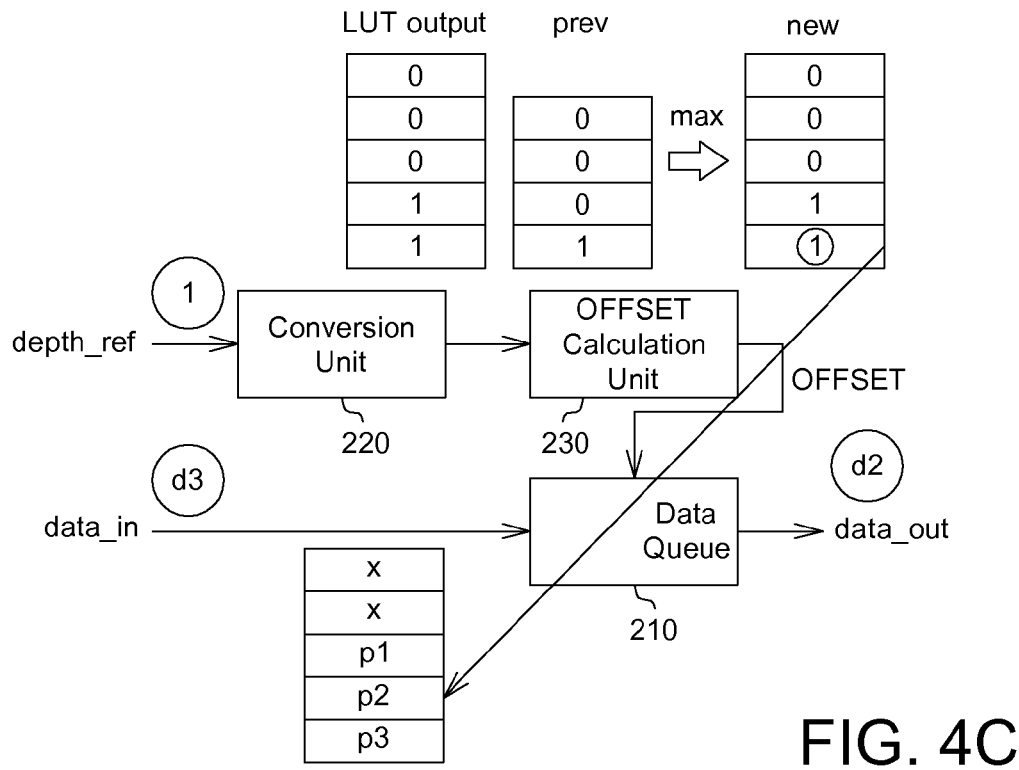

In FIG. 4C, the data queue 210 receives and temporarily stores an input data value data_in (d3) corresponding to a current pixel (P3). The conversion unit 220 outputs a current offset table LUT output (1, 1, 0, 0, 0) corresponding to a current depth parameter (1) according to the current depth parameter depth_ref (1) of the current pixel (P3). The offset calculation unit 230 correspondingly compares the current offset table LUT output with the previous offset table prev (1, 0, 0, 0) for maximization to obtain a new offset table new (1, 1, 0, 0, 0). The reference offset 1 corresponding to the current pixel P3 is outputted as the data offset OFFSET (1), and the 4 reference offsets (1, 0, 0, 0) is regarded as a previous offset table of the next pixel P4. The data queue 210 selects the first data from right to left based on the input data value data_in (d3) according to an integer part of the data offset OFFSET (1) to output an output data value data_out (d2) corresponding to the current pixel P3.

Figure 4D:
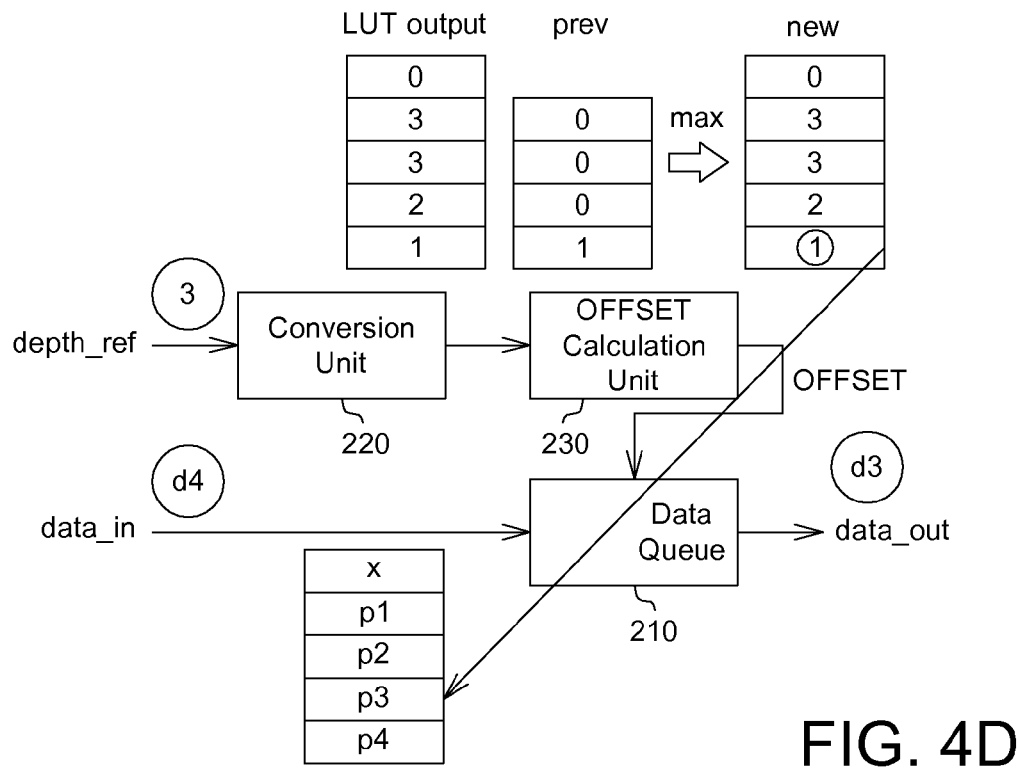

In FIG. 4D, the data queue 210 receives and temporarily stores an input data value data_in (d4) corresponding to a current pixel (P4). The conversion unit 220 outputs a current offset table LUT output (1, 2, 3, 3, 0) corresponding to a current depth parameter (3) according to the current depth parameter depth_ref (3) of the current pixel (P4). The offset calculation unit 230 correspondingly compares the current offset table LUT output with the previous offset table prev (1, 0, 0, 0) for maximization to obtain a new offset table new (1, 2, 3, 3, 0). The reference offset 1 corresponding to the current pixel P4 is outputted as the data offset OFFSET (1), and the 4 reference offsets (2, 3, 3, 0) is regarded as a previous offset table of the next pixel P5. The data queue 210 selects the first data from right to left based on the input data value data_in (d4) according to an integer part of the data offset OFFSET (1) to output an output data value data_out (d3) corresponding to the current pixel P4.

Figure 4E:
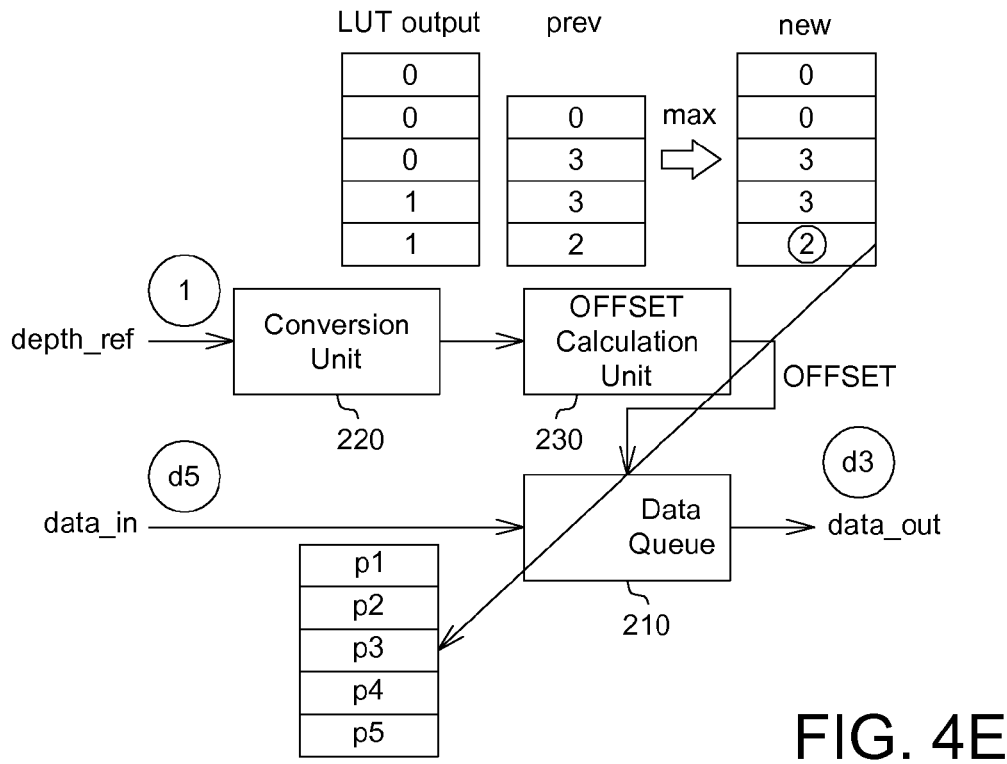

In FIG. 4E, the data queue 210 receives and temporarily stores an input data value data_in (d5) corresponding to a current pixel (P5). The conversion unit 220 outputs a current offset table LUT output (1, 1, 0, 0, 0) corresponding to a current depth parameter (1) according to the current depth parameter depth_ref (1) of the current pixel (P5). The offset calculation unit 230 correspondingly compares the current offset table LUT output with the previous offset table prev (2, 3, 3, 0) for maximization to obtain a new offset table new (2, 3, 3, 0, 0). The reference offset 2 corresponding to the current pixel P5 is outputted as the data offset OFFSET (2), and the 4 reference offsets (3, 3, 0, 0) is regarded as a previous offset table of the next pixel P6. The data queue 210 selects the second data from right to left based on the input data value data_in (d5) according to an integer part of the data offset OFFSET (2) to output an output data value data_out (d3) corresponding to the current pixel P5.

Figure 4F:
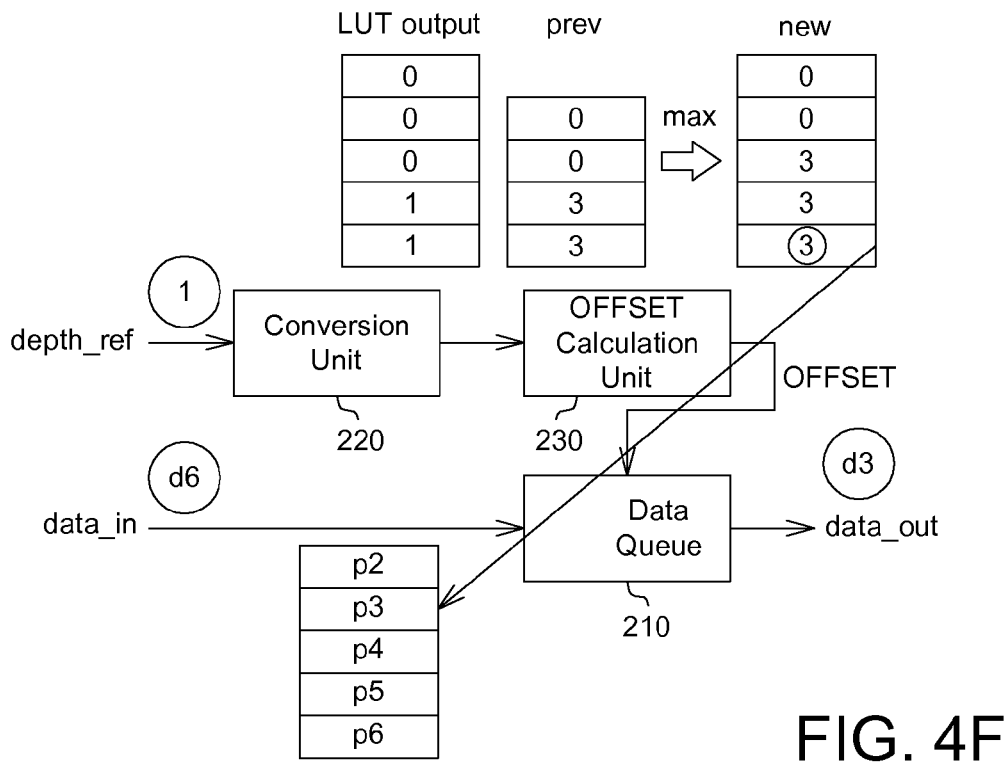

In FIG. 4F, the data queue 210 receives and temporarily stores an input data value data_in (d6) corresponding to a current pixel (P6). The conversion unit 220 outputs a current offset table LUT output (1, 1, 0, 0, 0) corresponding to a current depth parameter (1) according to the current depth parameter depth_ref (1) of the current pixel (P6). The offset calculation unit 230 correspondingly compares the current offset table LUT output with the previous offset table prev (3, 3, 0, 0) for maximization to obtain a new offset table new (3, 3, 0, 0, 0). The reference offset 3 corresponding to the current pixel P6 is outputted as the data offset OFFSET (3), and the 4 reference offsets (3, 0, 0, 0) is regarded as a previous offset table of the next pixel P7. The data queue 210 selects the third data from right to left based on the input data value data_in (d6) according to an integer part of the data offset OFFSET (3) to output an output data value data_out (d3) corresponding to the current pixel P6.

Figure 4G:
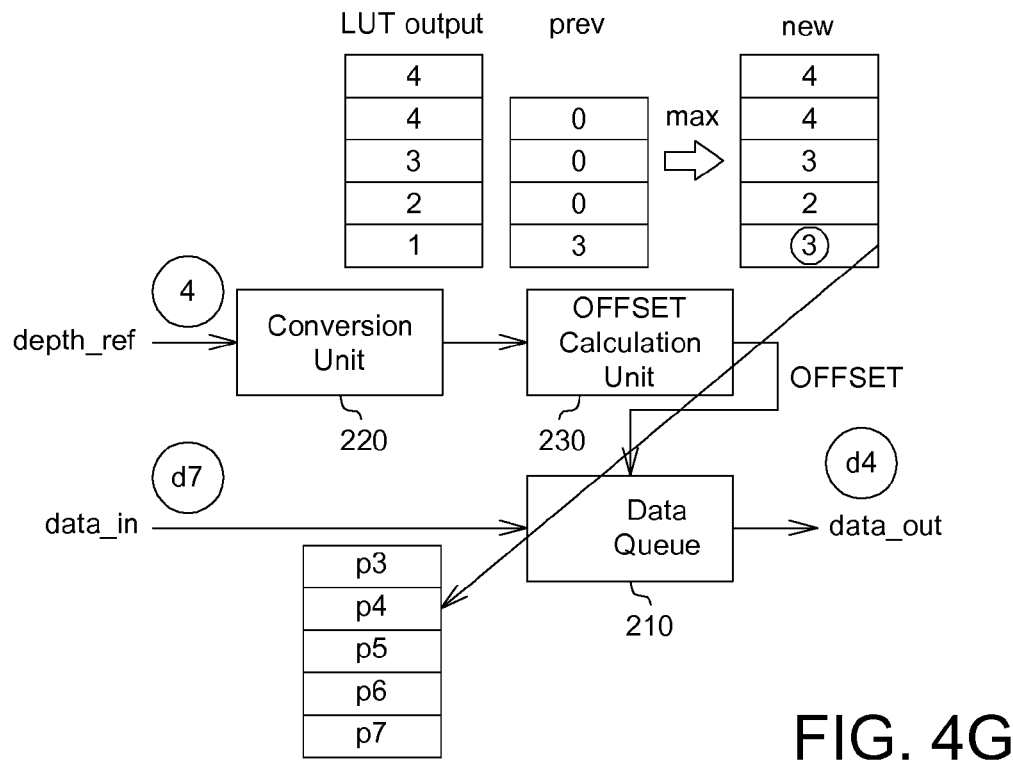

In FIG. 4G, the data queue 210 receives and temporarily stores an input data value data_in (d7) corresponding to a current pixel (P7). The conversion unit 220 outputs a current offset table LUT output (1, 2, 3, 4, 4) corresponding to a current depth parameter (4) according to the current depth parameter depth_ref (4) of the current pixel (P7). The offset calculation unit 230 correspondingly compares the current offset table LUT output with the previous offset table prev (3, 0, 0, 0) for maximization to obtain a new offset table new (3, 2, 3, 4, 4). The reference offset 3 corresponding to the current pixel P7 is outputted as the data offset OFFSET (3), and the 4 reference offsets (2, 3, 4, 4) is regarded as a previous offset table of the next pixel P8. The data queue 210 selects the third data from right to left based on the input data value data_in (d7) according to an integer part of the data offset OFFSET (3) to output an output data value data_out (d4) corresponding to the current pixel P7.

Figure 4H:
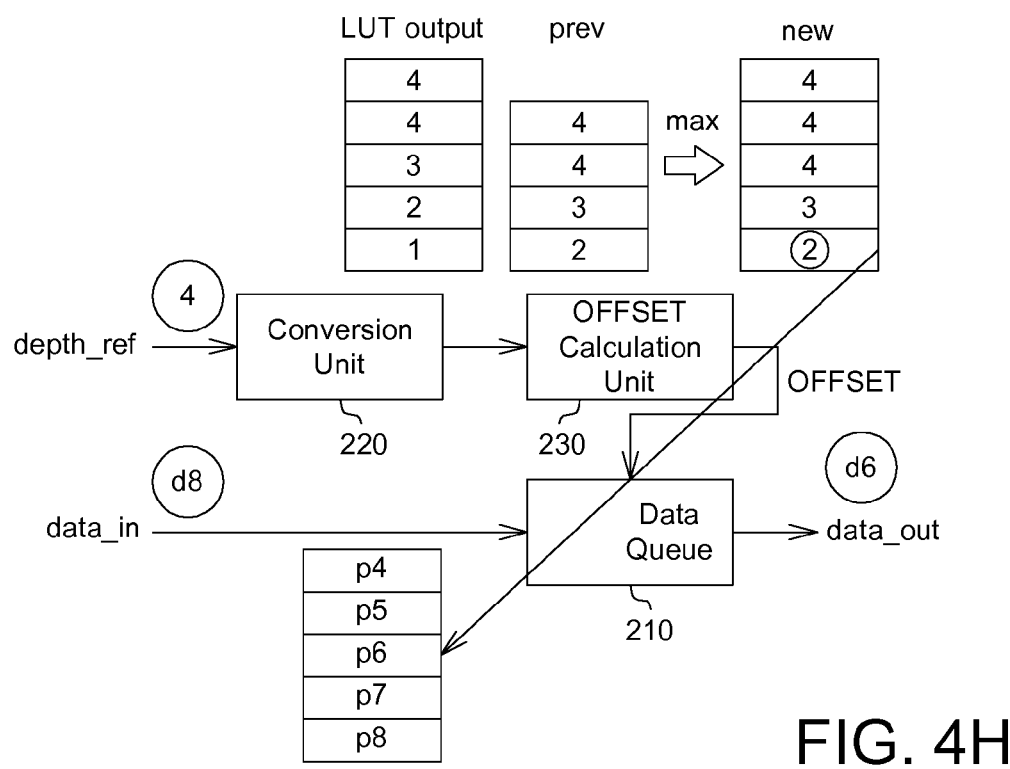

In FIG. 4H, the data queue 210 receives and temporarily stores an input data value data_in (d8) corresponding to a current pixel (P8). The conversion unit 220 outputs a current offset table LUT output (1, 2, 3, 4, 4) corresponding to a current depth parameter (4) according to the current depth parameter depth_ref (4) of the current pixel (P8). The offset calculation unit 230 correspondingly compares the current offset table LUT output with the previous offset table prev (2, 3, 4, 4) for maximization to obtain a new offset table new (2, 3, 4, 4, 4). The reference offset 2 corresponding to the current pixel P8 is outputted as the data offset OFFSET (2), and the 4 reference offsets (3, 4, 4, 4) is regarded as a previous offset table of the next pixel P9. The data queue 210 selects the second data from right to left based on the input data value data_in (d8) according to an integer part of the data offset OFFSET (2) to output an output data value data_out (d6) corresponding to the current pixel P8.

Figure 4I:
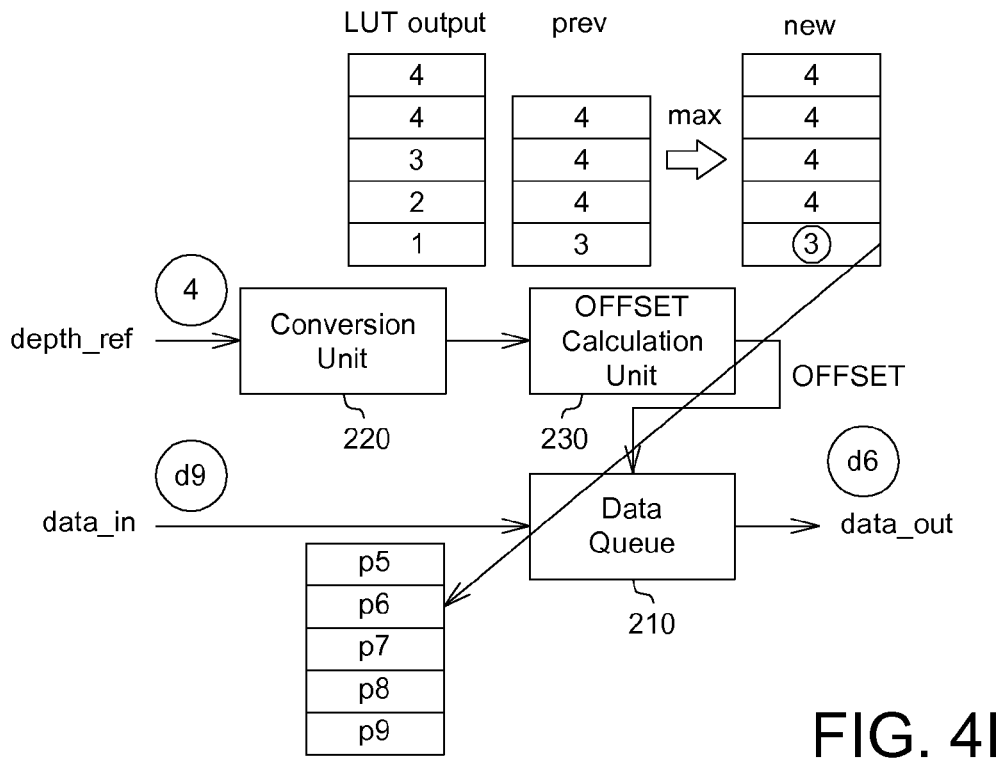

In FIG. 4I, the data queue 210 receives and temporarily stores an input data value data_in (d9) corresponding to a current pixel (P9). The conversion unit 220 outputs a current offset table LUT output (1, 2, 3, 4, 4) corresponding to a current depth parameter (4) according to the current depth parameter depth_ref (4) of the current pixel (P9). The offset calculation unit 230 correspondingly compares the current offset table LUT output with the previous offset table prev (3, 4, 4, 4) for maximization to obtain a new offset table new (3, 4, 4, 4, 4). The reference offset 3 corresponding to the current pixel P9 is outputted as the data offset OFFSET (3), and the 4 reference offsets (4, 4, 4, 4) is regarded as a previous offset table of the next pixel P10. The data queue 210 selects the third data from right to left based on the input data value data_in (d9) according to an integer part of the data offset OFFSET (3) to output an output data value data_out (d6) corresponding to the current pixel P9.

Figure 4J:
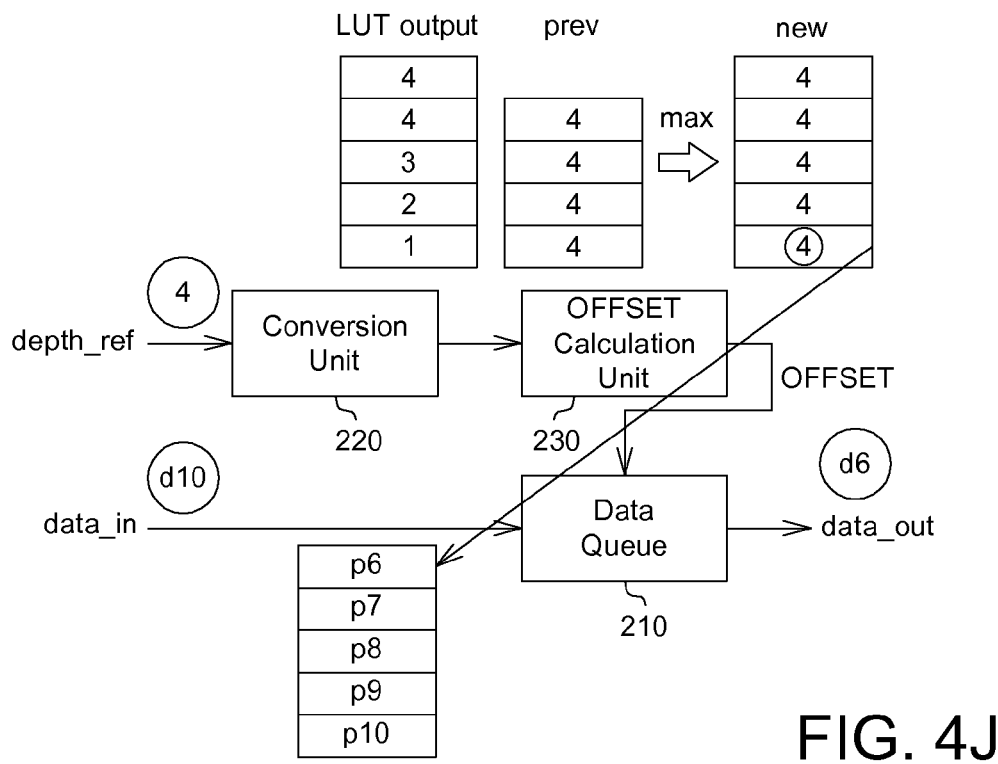

In FIG. 4J, the data queue 210 receives and temporarily stores an input data value data_in (d10) corresponding to a current pixel (P10). The conversion unit 220 outputs a current offset table LUT output (1, 2, 3, 4, 4) corresponding to a current depth parameter (4) according to the current depth parameter depth_ref (4) of the current pixel (P10). The offset calculation unit 230 correspondingly compares the current offset table LUT output with the previous offset table prev (4, 4, 4, 4) for maximization to obtain a new offset table new (4, 4, 4, 4, 4). The reference offset 4 corresponding to the current pixel P10 is outputted as the data offset OFFSET (4), and the 4 reference offsets (4, 4, 4, 4) is regarded as a previous offset table of the next pixel P11. The data queue 210 selects the fourth data from right to left based on the input data value data_in (d10) according to an integer part of the data offset OFFSET (4) to output an output data value data_out (d6) corresponding to the current pixel P10.

Figure 4K:
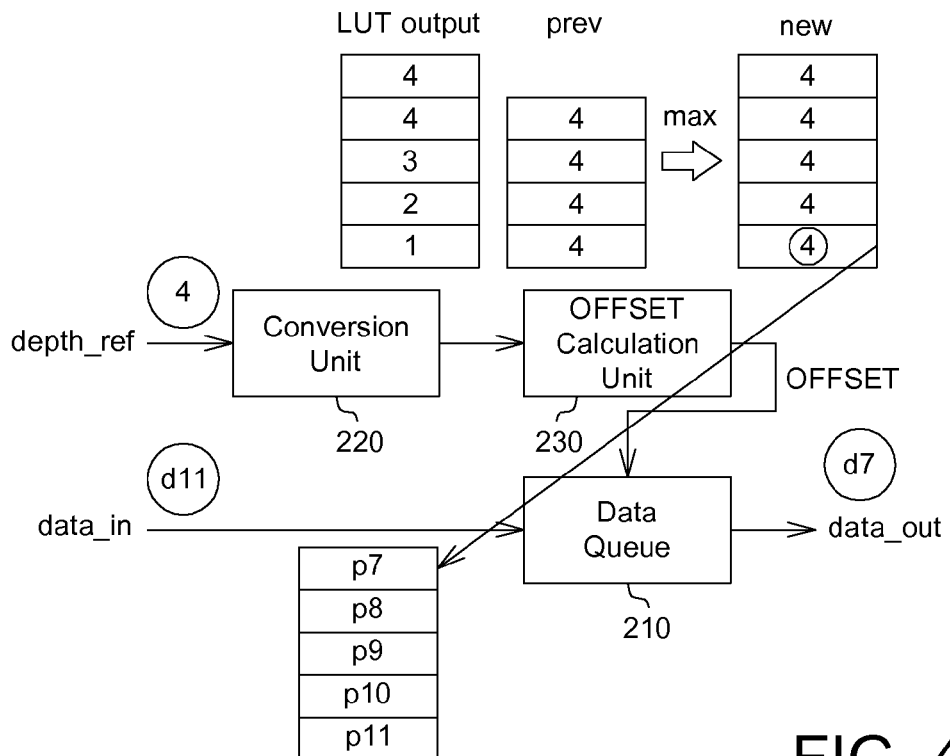

In FIG. 4K, the data queue 210 receives and temporarily stores an input data value data_in (d11) corresponding to a current pixel (P11). The conversion unit 220 outputs a current offset table LUT output (1, 2, 3, 4, 4) corresponding to a current depth parameter (4) according to the current depth parameter depth_ref (4) of the current pixel (P11). The offset calculation unit 230 correspondingly compares the current offset table LUT output with the previous offset table prev (4, 4, 4, 4) for maximization to obtain a new offset table new (4, 4, 4, 4, 4). The reference offset 4 corresponding to the current pixel P11 is outputted as the data offset OFFSET (4), and the 4 reference offsets (4, 4, 4, 4) is regarded as a previous offset table of the next pixel P12. The data queue 210 selects the fourth data from right to left based on the input data value data_in (d11) according to an integer part of the data offset OFFSET (4) to output an output data value data_out (d7) corresponding to the current pixel P11.

Referring concurrently to FIG. 3 and FIGS. 4A to 4K, it can be obtained that the 2D to 3D image conversion apparatus of the embodiment does not cause data loss problems, thereby needing no additional follow-up hole filling processing to correct the images. Meanwhile, it can be observed in FIG. 3 and FIGS. 4A to 4K that there exists no data crossing problems. In addition, the conversion unit 220 may also output the current offset table according to other formulas, such as $y/(y+1)$, $2y/(y+1)$, $3y/(y+1)$, ..., $(y-1)\times y/(y+1)$, $y\times y/(y+1)$, $y\times y/(y+1)$, 0, 0, ... etc. as the current depth parameter is equal to y.

Figure 5:
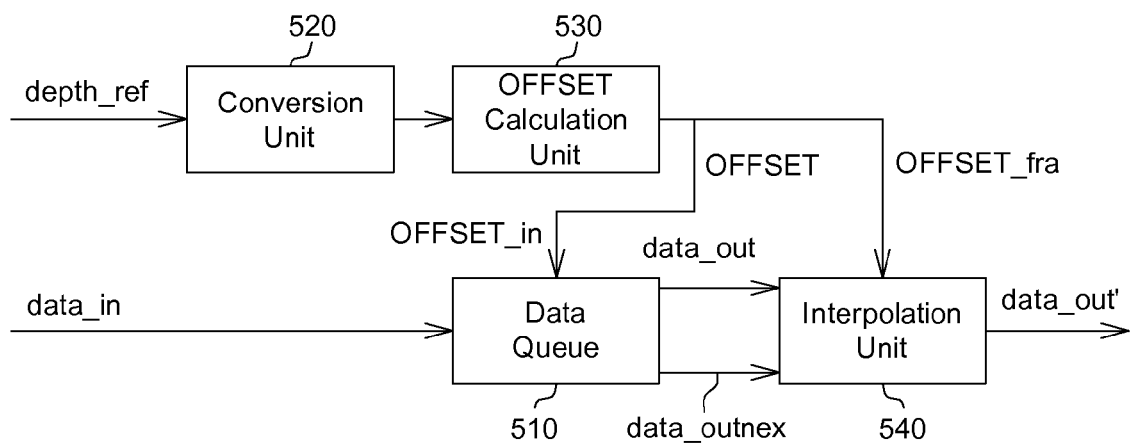
FIG. 5 shows a block diagram illustrating a 2D to 3D image conversion apparatus according to another embodiment.

Besides, the data offset can be accurate to the digit to make the 3D image smoother. Referring to FIG. 5, a block diagram illustrating a 2D to 3D image conversion apparatus according to another embodiment is shown. Similar to the 2D to 3D image conversion apparatus 200, the 2D to 3D image conversion apparatus 500 includes a data queue 510, a conversion unit 420 and an offset calculation unit 530; in addition, the 2D to 3D image conversion apparatus 500 further includes an interpolation unit 540. The interpolation unit 540 receives the output data value data_out and a subsequent data value data_outnex from the data queue 510, and performs an interpolation operation on the output data value data_out and the subsequent data value data_outnex according to a fraction part offset_frac of the data offset to obtain an interpolation data value data_out'. In FIG. 5, the interpolation operation may be 2 points linear interpolation or S-curve interpolation, and it is not limited thereto.

Figure 6:
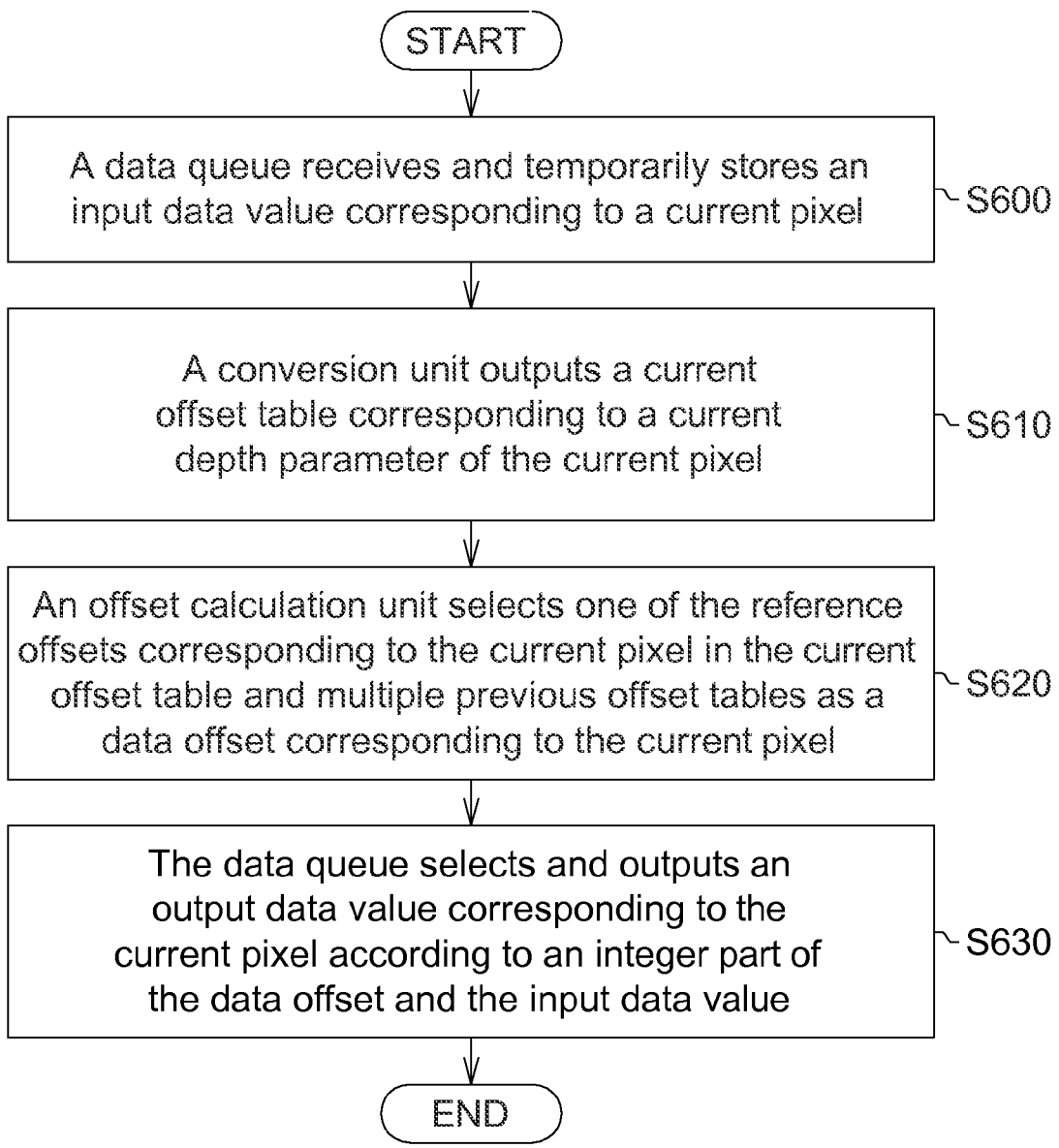
FIG. 6 shows a flow chart of a 2D to 3D image conversion method according to an embodiment.

The disclosure further proposes a 2D to 3D image conversion method, referring to a flow chart of a 2D to 3D image conversion shown in FIG. 6. After the start, in step S600, an input data value corresponding to a current pixel is received and temporarily stored. Next, in step S610, a current offset table corresponding to a current depth parameter of the current pixel is outputted. The current offset table includes (m+1) reference offsets corresponding to the current pixel and neighboring m pixels, and m is a positive integer. Then, in step S620, one of the reference offsets corresponding to the current pixel in the current offset table and multiple previous offset tables is selected as a data offset corresponding to the current pixel. In step S630, an output data value corresponding to the current pixel is selected and outputted according to an integer part of the data offset and the input data value, thus the 2D to 3D image conversion is completed and finished.

The detailed principles of the above 2D to 3D image conversion method have been described in FIGS. 2 to 4K and related content, and related operations, such as how to generate the current offset table, and how to select m, etc. can also be obtained from the above embodiments, so detailed description thereof will be omitted.

The 2D to 3D image conversion apparatus and method proposed in the embodiments of the disclosure utilizes simple depth image based rendering, and does not cause output data loss problems, thereby capable of converting a 2D image into a 3D image without additional hole filling. In addition, it can avoid generating data crossing problems by suitable conversion design.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A 2D to 3D image conversion apparatus, for converting a 2D image to a 3D image, comprising:
    a data queue for receiving and temporarily storing an input data value of a current pixel of the 2D image;
    a conversion unit, wherein the conversion unit outputs a current offset table corresponding to a current depth parameter of the current pixel, the current offset table including (m+1) reference offsets corresponding to the current pixel and neighboring m pixels, m being a positive integer; and
    an offset calculation unit, coupled to the data queue and the conversion unit, wherein the offset calculation unit selects one of the reference offsets corresponding to the current pixel in the current offset table and multiple previous offset tables as a data offset corresponding to the current pixel;
    wherein the data queue selects and outputs an output data value of the 3D image corresponding to the current pixel according to an integer part of the data offset and the input data value.

2. The 2D to 3D image conversion apparatus according to claim 1, wherein the offset calculation unit selects a maximum value of the reference offsets as the data offset of the current pixel.

3. The 2D to 3D image conversion apparatus according to claim 1, wherein the offset calculation unit selects a minimum value of the reference offsets as the data offset of the current pixel.

4. The 2D to 3D image conversion apparatus according to claim 1, wherein the m pixels are subsequent to the current pixel.

5. The 2D to 3D image conversion apparatus according to claim 1, wherein the m pixels are antecedent to the current pixel.

6. The 2D to 3D image conversion apparatus according to claim 1, further comprising:
    an interpolation unit, coupled to the data queue and the offset calculation unit, wherein the interpolation unit receives the output data value and a subsequent data value from the data queue, and performs an interpolation operation on the output data value and the subsequent data value according to a fraction part of the data offset to obtain an interpolation data value.

7. The 2D to 3D image conversion apparatus according to claim 1, wherein the conversion unit obtains the current offset table from an Offset LUT according to the current depth parameter.

8. The 2D to 3D image conversion apparatus according to claim 1, wherein the conversion unit inserts the current depth parameter into a formula to obtain the current offset table, and the formula is $1, 2, 3, \ldots, (y-1), y, y, 0, 0, \ldots, 0$ as the current depth parameter is equal to y.

9. The 2D to 3D image conversion apparatus according to claim 1, wherein the conversion unit inserts the current depth parameter into a formula to obtain the current offset table, and the formula is $y/(y+1), 2y/(y+1), 3y/(y+1), \ldots, (y-1) \times y/(y+1), y \times y/(y+1), y \times y/(y+1), 0, 0, \ldots, 0$ as the current depth parameter is equal to y.

10. The 2D to 3D image conversion apparatus according to claim 1, wherein m is the maximum possible offset.

11. A 2D to 3D image conversion method, for converting a 2D image to a 3D image, the method comprising:
    receiving and temporarily storing an input data value of a current pixel of the 2D image;
    outputting a current offset table corresponding to a current depth parameter of the current pixel, the current offset table including (m+1) reference offsets corresponding to the current pixel and neighboring m pixels, m being a positive integer;
    selecting one of the reference offsets corresponding to the current pixel in the current offset table and multiple previous offset tables as a data offset corresponding to the current pixel; and
    selecting and outputting an output data value of the 3D image corresponding to the current pixel according to an integer part of the data offset and the input data value.

12. The 2D to 3D image conversion method according to claim 11, wherein the step of selecting one of the reference offsets as the data offset of the current pixel is to select a maximum value of the reference offsets as the data offset of the current pixel.

13. The 2D to 3D image conversion method according to claim 11, wherein the step of selecting one of the reference offsets as the data offset of the current pixel is to select a minimum value of the reference offsets as the data offset of the current pixel.

14. The 2D to 3D image conversion method according to claim 11, wherein the m pixels are subsequent to the current pixel.

15. The 2D to 3D image conversion method according to claim 11, wherein the m pixels are antecedent to the current pixel.

16. The 2D to 3D image conversion method according to claim 11, further comprising:
    receiving the output data value and a subsequent data value from the data queue, and performing an interpolation operation on the output data value and the subsequent data value according to a fraction part of the data offset to obtain an interpolation data value.

17. The 2D to 3D image conversion method according to claim 11, further comprising:
    obtaining the current offset table from an Offset LUT according to the current depth parameter.

18. The 2D to 3D image conversion method according to claim 11, further comprising:
    inserting the current depth parameter into a formula to obtain the current offset table;
    wherein the formula is $1, 2, 3, \ldots, (y-1), y, y, 0, 0, \ldots, 0$ as the current depth parameter is equal to y.

19. The 2D to 3D image conversion method according to claim 11, further comprising:
  inserting the current depth parameter into a formula to obtain the current offset table;
  wherein the formula is y/(y+1), 2y/(y+1), 3y/(y+1), ..., (y−1)×y/(y+1), y×y/(y+1), y×y/(y+1), 0, 0, ...,0 as the current depth parameter is equal to y.

20. The 2D to 3D image conversion method according to claim 11, wherein m is the maximum possible offset.

* * * * *